INVENTOR.
Mark Levine
By Davis, Hoxie, Faithfull & Hapgood
Attorneys

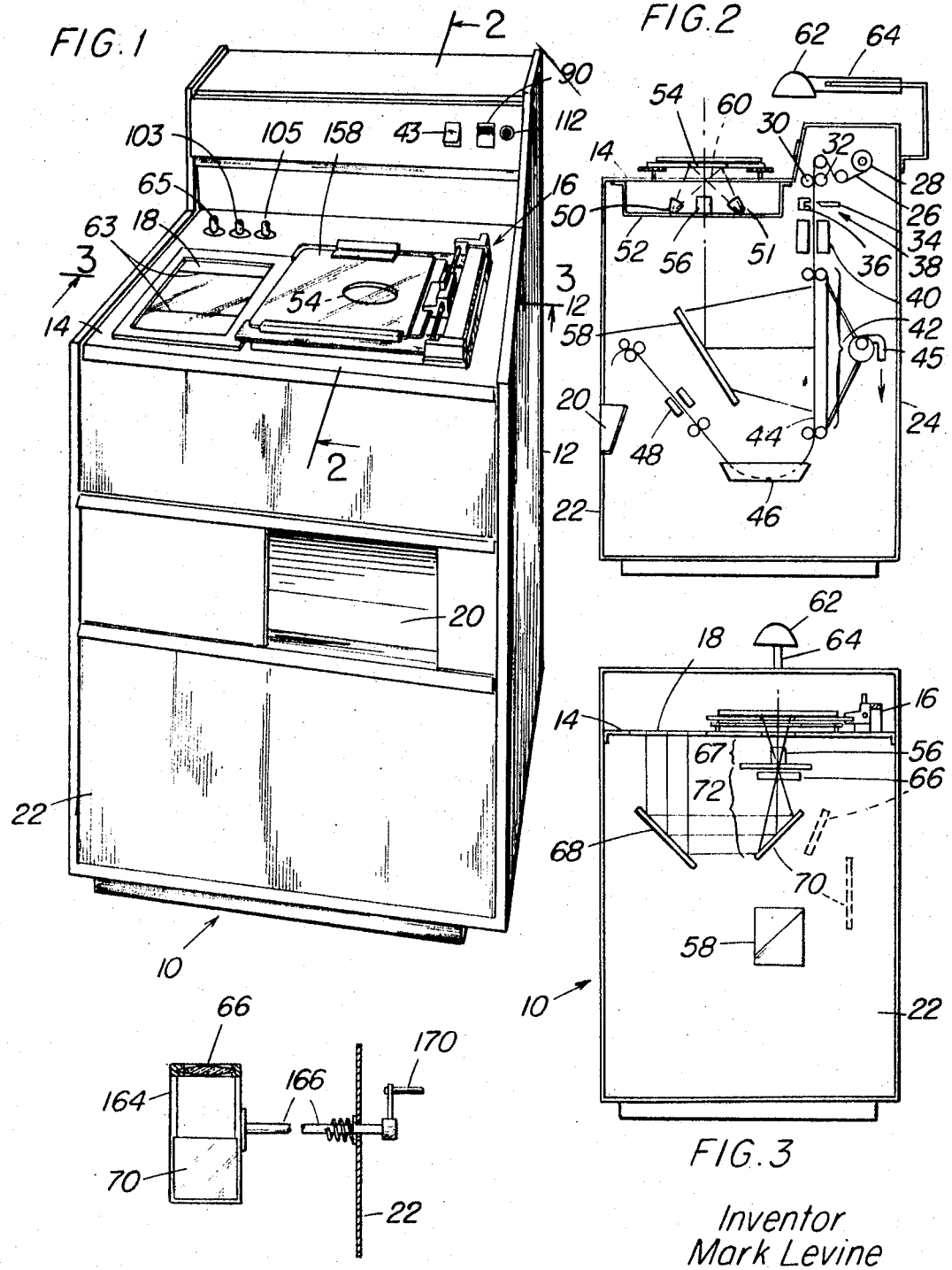

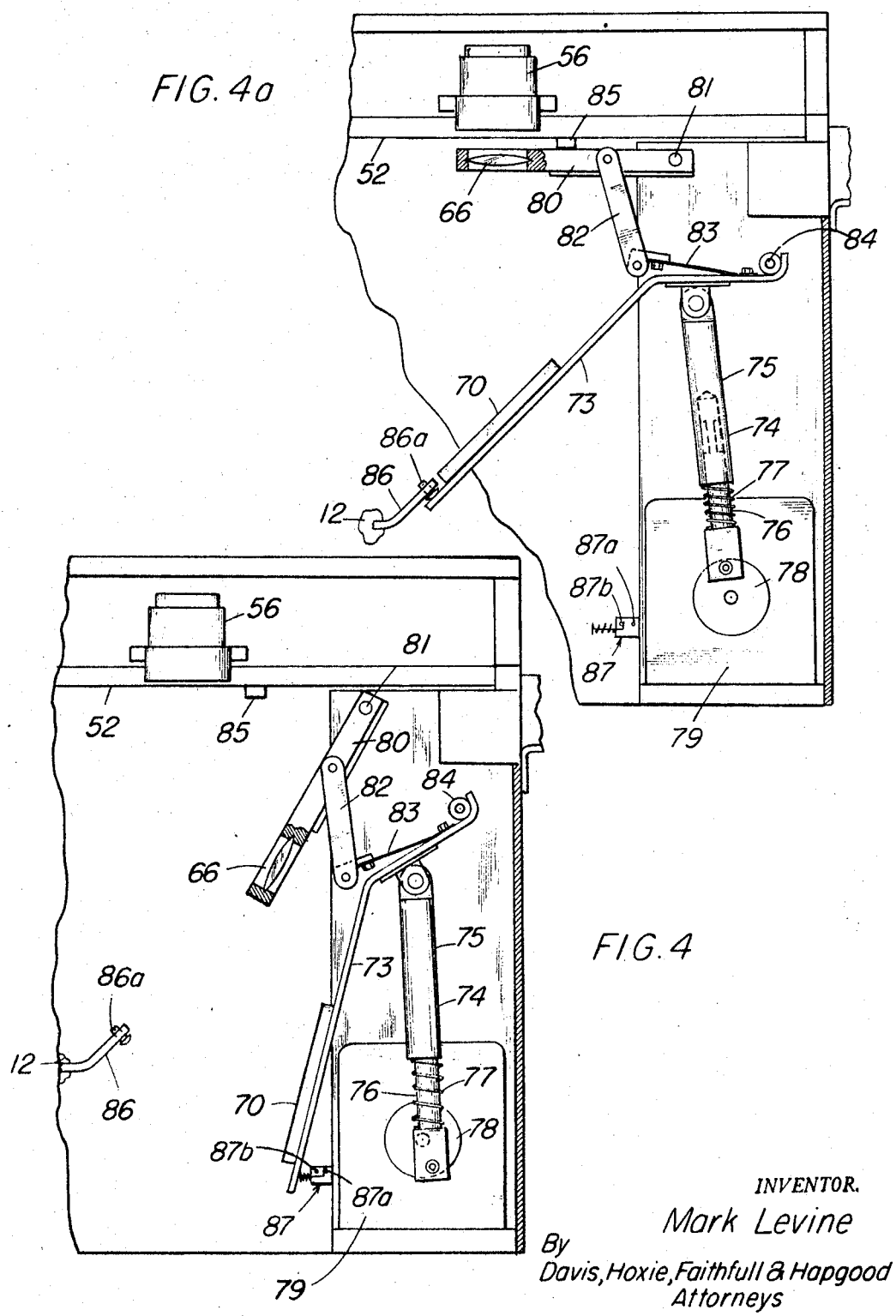

INVENTOR.
Mark Levine
By Davis, Hoxie, Faithfull & Hapgood
Attorneys

3,463,585
COMBINATION PRINTER-VIEWER
Mark Levine, Plainview, N.Y., assignor to Readex Microprint Corporation, New York, N.Y., a corporation of New York
Filed June 22, 1967, Ser. No. 648,071
Int. Cl. G03b 13/28, 27/70
U.S. Cl. 355—45                                    12 Claims

ABSTRACT OF THE DISCLOSURE

A combination printer-viewer having a printing station, a viewing station, a primary fixed focus optical system for enlarging an opaque or transparent microform image and projecting it to the printing station and an auxiliary, fixed focus optical system operating in combination with the primary optical system for projecting a smaller image to the viewing station. A scanning apparatus provides for planar relocation of the microform with respect to the optical system.

Background

This invention relates to printers utilizing photographic techniques and, more particularly, to printers for enlarging and printing opaque and transparent microforms and, additionally, having a viewing station.

In view of the wide acceptance and use of microforms, a need exists for printers capable of enlarging microforms a predetermined ratio to provide a print readable with the naked eye. The term "naked eye" is defined to mean the unaided eye and the eye aided by conventional eyeglasses, but not aided by optical means providing substantial enlargement, such as magnifying glasses. It is also necessary to provide the printer with a viewing capability so that the user can select the particular portion of the microform he desires to print. For economy of space and to avoid sacrificing print size it is necessary to provide a lesser enlargement ratio for viewing purposes than is provided for printing purposes. Because microforms are available on opaque and transparent mediums, the printer-viewer also should have the capability of projecting and printing both types without substantial modification and by employing a single optical system.

In order to minimize distortion in the printing operation and, secondarily, for simplicity of construction, operation and maintenance, the portion of the optical system directing the image to the printing station should include the minimum number of optical elements.

It is also necessary to have a microform transport mechanism which provides a means for relocating the sheet relative to an optical projection axis in order to select the particular image desired to be viewed. Prior art devices having this capability employ various mechanical means such as worm gears, racks, and pinions, slide rails, etc., which support and transport the microform. Because the microform is supported by the transport apparatus, any tolerance accumulation and inaccuracies in manufacture of the support apparatus results in movement of the microform parallel to the optical projection axis or, in other words, removes the microform from the focal plane. Such movement makes refocusing necessary each time the microform is moved.

While combination printer-viewers are known, such as are illustrated in United States Patents 3,183,768 and 2,256,397, none provide all of the above mentioned features.

Summary of invention

Briefly stated, the present invention, in one form comprises basically a projector printer employing a conventional electrostatic printing process. One reflector, the minimum number of reflectors necessary for providing a properly oriented image at the printing station, is used to direct the image received through the lens to the photosensitive medium. The lens and optical path length are chosen and fixed to provide a predetermined magnification in order that the print be of a desired size. The lens is prefocused and, because the location of the microform is fixed in the focal plane by a holding means, there is no need to refocus the optical system.

A viewing screen is located adjacent to the microform holder. The size of the image projected onto the screen is significantly smaller than the size of the image directed to the printing station in order to conserve space. The size should be no larger than that required by the user to determine whether or not he has properly located the portion of the microform he desires to print. In order to achieve this lesser magnification of the original microform the screen is located at a lesser optical path distance from the microform than is the printing station. Because the lens has been chosen and focused to produce a sharp image at the printing station and because the length of the optical path to the viewing screen is less than the optical path to the printing station, it is necessary to employ an auxiliary optical projection system. The auxiliary system includes a supplemental lens and mirror which are movably mounted for combined relocation into and out of optical alignment with the primary lens.

When it is desired to view the microform the auxiliary optical system is moved into alignment with the primary lens in order to direct and focus the image onto the viewing screen, the focal length of the primary and auxiliary lens together being less than the focal length of either lens alone. When it is desired to print the portion of the microform that is in alignment with the optical system the auxiliary optical system is retracted from the optical path, thus leaving just the primary system active for directing the image to the printing station.

In order to provide the capability of printing and viewing both opaque and transparent microforms while employing a single optical system (which includes the aforedescribed primary and auxiliary systems), two light sources are required. For projecting opaque microforms, one or more projection lamps are located on the same side of the microform as is the lens and the lamps are directed upwardly at the microform to illuminate the microform. To project a transparent microform a different light source is employed which is located on the side of the microform opposite from the lens such that the light transilluminates the transparency. The light sources are chosen to provide equal effective light intensity at the printing station so that no adjustment need be made in the printing and developing process to accommodate opaque and transparent microforms.

Provision for moving the microform without destroying the focus is achieved by providing a support plate normal to the optical projection axis, the support plate having the upper surface thereof coated with a lubricating medium such as polytetrafluoroethylene. An aperture coaxial with the projection axis, is provided through the support plate. The microform is held between a pair of transparent, planar, glass plates forming a sandwich, the lower plate of which rests directly upon the support plate for its sole support. A carriage mounted on the support plate and drivingly connected to the lower glass plate, can move the microform in any linear direction within a plane normal to projecetion axis. Because the microform is only supported by the glass plate and support plate, as long as they are flat and normal to the projection axis sliding movement of the sandwich on the support plate effects planar movement of the microform and avoids the need for focusing the system each time the microform is moved.

Drawings

These and other features and advantages of the subject invention will become readily apparent to those skilled in the art from the following detailed description in combination with the drawings in which like characters denote like parts and wherein:

FIGURE 1 is a perspective view of a combination printer-viewer formed in accordance with this invention, FIGURE 2 is a sectional view taken along the line 2—2 of FIGURE 1, FIGURE 3 is a sectional view taken along the line 3—3 of FIGURE 1, FIGURE 4 is a schematic illustration of a linkage system for positioning the auxiliary optical system shown in the retracted position.

FIGURE 4a is the linkage of FIGURE 4 shown in the functioning position,

FIGURE 7 is a schematic illustration of a means for manually relocating the auxiliary optical system.

General description of invention

Figure 5:
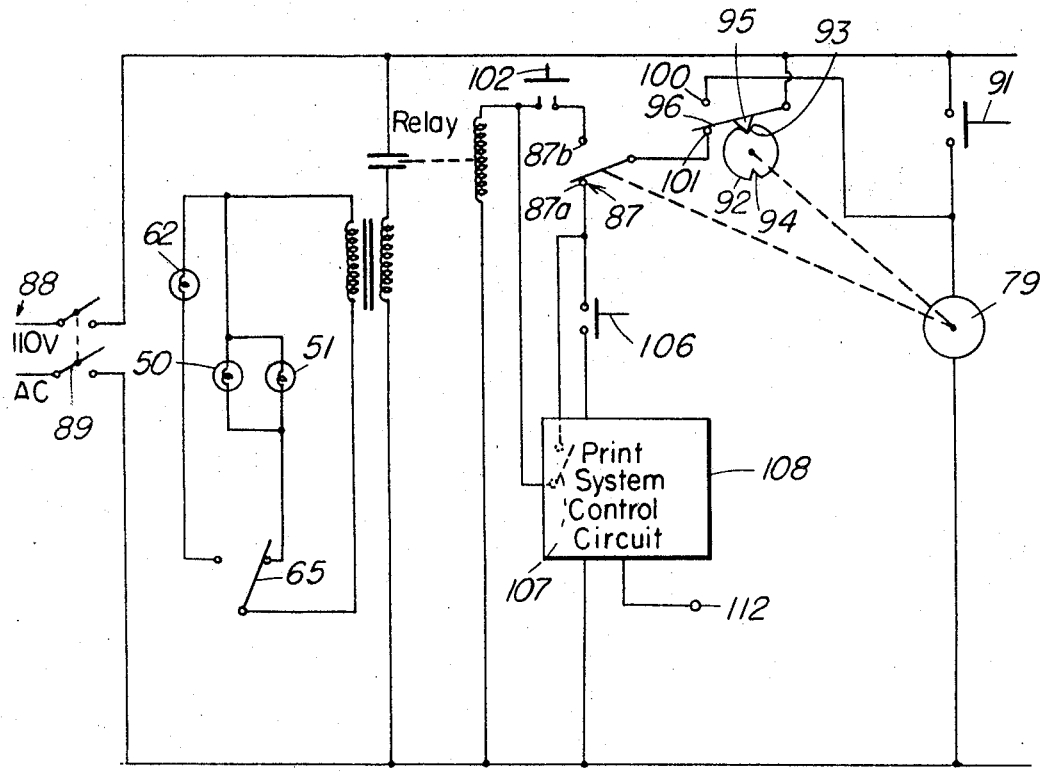
FIGURE 5 is a schematic circuit diagram for a substantially automatically operated printer-viewer.

With reference to the drawings and, more specifically, FIGURES 1 through 3, there is illustrated a combination printer-viewer 10 having a housing 12 which includes a horizontal work surface 14. Mounted on the work surface 14 is a microform holder and transport mechanism 16 capable of planar movement. Adjacent to the microform holder 16 is a translucent, rear illumination, viewing screen 18. A print delivery slot and receiver 20 is provided in the housing's front wall 22.

Mounted within, and near the rear wall 24 of the housing 12 is a continuous sheet of copying paper 26 which is drawn from a roll 28 by driving rollers 30, 32. The paper passes between male and female portions 34, 36 respectively of a paper cutting means 38 and then passes adjacent to an electrostatic sensitizer 40 which renders the paper 26 photoelectrically sensitive. The paper 26 now is ready to enter the printing station 42. Because the paper is supplied in continuous roll form and is cut into individual pieces by paper cutting means 38, the printer-viewer 10 is adapted for providing prints of any desired length which can be controlled by merely operating a selector means. In practice, the machine is provided with a selector button 43 which permits selection of two paper sizes, conventional letter size paper of 11 inch length and legal size paper of 14 inch length.

Actuated by a signal from the operator a motor (not shown) through appropriate gearing, rotates the driving rollers 30, 32 in order to advance the paper 26 onto a perforated belt 44 which is subjected to a reduced pressure source 45 in order to hold the paper thereon. The belt delivers the sensitized paper to the printing station 42 wherein it is stopped and exposed to the image desired to be printed as is described below. The paper then passes through a developing bath 46, a heater 48 which dries the paper and then into the receiver 20.

Printing operation optical system

In order to project an image of a opaque microform to the printing station 42 at least one lamp and preferably two 50, 51 are provided beneath the microform holder 16 on a support platform 52. An aperture 54 extends through the horizontal work surface 14 and the microform (not shown) which can be any of the several types of sheets employed for retaining microimages, such as film, paper, etc., is located above and in alignment with the aperture 54. Below the aperture and in alignment therewith is one conventional projecting lens 56 mounted on the support platform 52. The lens focal length is preset for the length of the optical path to the printing station 42. Below the lens 56 is fixedly mounted a reflecting surface 58, such as a mirror, disposed at an appropriate angle to direct the image to the printing station 42. One is the minimum number of mirrors that can be employed and still have a properly oriented image appear at the printing station 42 because the lens 56 inverts the image. The mirror inverts the image again resulting in a properly oriented image. By using the minimum number of mirrors and lenses, distortion is minimized. The lens 56 and stationary mirror 58 comprise the primary optical system.

The lamps 50, 51 are aligned in such a manner as to produce no reflection, but merely illuminate the microform. This is accomplished by directing the lamps such that the primary reflected rays, illustrated by the phantom lines 60, are not received by the lens 56. The lamps may be any of several conventional projector lamps however, it has been found that superior results are achieved by using axial quartz halogen projection lamps manufactured by the General Electric Company.

If a transparent microform is the subject to be printed, a lamp 62 mounted on the side of the microform remote from the lens 56 is employed. A suitable lamp for this use is a conventional slide projector lamp. The lamp 62 is provided with a telescoping support arm 64 to permit the lamp to be retracted out of the way when opaque microforms are used. Since the degree of light transmission through a transparency varies from the quantity of light reflected from illumination of an opaque microform, the lamp 62 must be coordinated with the lamps 50, to provide equal effective intensity at the printing station 42. A selector switch 65 is provided to permit selection of the appropriate lamp depending upon the type of microform desired to be printed. Instead of the selector switch 65, a similar two position switch (not shown) can be incorporated with the telsecoping support arm 64 so that the appropriate lamp is selected by positioning the support arm.

Viewing operation optical system

FIGURE 3 illustrates an auxiliary optical system for directing the microform image to the viewing screen 18. The auxiliary optical system is designed to produce an image at the viewing screen 18 which is substantially smaller than the image directed to the printing station 42. The image is of a minimum size consistent with the ability to identify and know that the microform, or desired portion of the microform, is in proper alignment with the optical system. It has been found that a screen area of approximately 60% of the corresponding printing station area is suitable. For example, a 5″ x 8¼″ area on the viewing screen corresponding to a printing station area of 8½″ x 14″ is optimum for viewing purposes. The screen is provided with scribe lines 63, or other appropriate indicia, to indicate conventional letter size paper of 11 inch length at the printing station 42.

Since the viewing optical path is much shorter than the printing optical path, it is necessary to vary the focal length of the lens system. While this can be accomplished by using a variable or adjustable lens, such is undesirable because it would require constant readjustment of the lens for printing and for viewing. Because magnification of the microform for printing is substantial, any slight focal maladjustment in the printing operation would result in a blurred or poorly defined print. To avoid this difficulty an auxiliary, movable lens 66 of positive focal length is used which, in combination with the primary lens 56, forms a combination lens 67 having a focal length designed for the shorter optical path leading to the viewing screen 18. The auxiliary lens was chosen to be used with the viewing operation because the addition of the auxiliary lens adds some distortion to the image which is acceptable for viewing purposes, but not for printing purposes.

Since the viewing screen is positioned adjacent to the microfilm holder 16 for simplicity of use, the optical path required is essentially U-shaped; that is, the image passes vertically downwardly through the combination lens 67, is reflected horizontally to a position beneath the viewing screen 18, and is then reflected upwardly to the translucent screen 18. To accomplish this path a stationary reflecting surface or mirror 68 is mounted beneath the viewing screen 18 and an auxiliary movable mirror 70 is positionable beneath the combination lens, the two mirrors being arranged to provide the desired optical path. The two mirrors 68, 70 plus the rear illumination viewing screen provide the proper image orientation as observed by the viewer.

The auxiliary lens 66 and auxiliary mirror 70 comprise an auxiliary optical system 72 for use in the viewing mode. As can be seen from FIGURE 3, it is necessary to retract the auxiliary optical system 72, indicated in its retracted position by the dotted lines, when the printing operation is desired since the auxiliary optical system prevents passage of the image to the stationary mirror 58 and, therefore, to the printing station 42.

Adverting now to FIGURES 4 and 4a, there is illustrated a linkage system for providing simultaneous movement of the auxiliary lens 66 and auxiliary mirror 70. FIGURE 4 illustrates the auxiliary optical system 72 in its retracted, non-functioning position while FIGURE 4a illustrates the auxiliary optical system in its functioning position.

The auxiliary mirror 70 is mounted on a link 73 which is pivotally connected to a crank shaft 74. The crank shaft is formed of two telescoping rods 75, 76, and has a spring 77 mounted therebetween to permit overrun and insure placement of the auxiliary optical system 72 in its proper, functioning position. The crank shaft 74 is drivingly connected at an eccentric position to a circular disc 78 attached to the shaft of a control motor 79.

The auxiliary lens 66 is mounted on a link 80 which is pivotally attached to the housing 12 by pin 81. An interconnecting link 82 is pivotally attached at one end thereof to the lens link 80 and at the other end thereof to one end of a spring link 83. The other end of the spring link 83 is mounted on the mirror link 73.

Rotation of the disc 78 causes the crank shaft to reciprocate and, in turn, causes the mirror link 73 and mirror 70 to rotate about a pivot point 84 from its retracted position to its functioning position. Because the mirror link 73 is connected to the lens link 80, the lens link also pivots from its retracted position to its functioning position wherein the lens 70 is axially aligned with the primary lens 56. A lens stop 85 is mounted on the lens support platform 52 and serves as an abutment for the lens link 80 when the auxiliary lens 66 is in proper position. A mirror stop 86, attached to the housing 12, is provided to assure proper positioning of the auxiliary mirror 70. An adjustable mirror stop screw 86a permits adjustment of the mirror position if such is necessary.

The linkage system is designed such that the lens link 80 abuts the lens stop 85 at a time just prior to the abutment of the mirror link 73 against its stop 86. The spring link 83 permits this staggered positioning of the auxiliary lens and mirror and the force of the spring link consistently effects proper placement of the auxiliary lens 66.

A single pole, double throw switch 87 is attached to the housing such that when the auxiliary optical system 72 is in its normal retracted position (FIGURE 4) the mirror link 73 effects closing of contact 87a to permit actuation of the printing operation. When the auxiliary optical system is moved towards its functioning position (FIGURE 4a) contact 87b is closed to permit operation of the lamps and contact 87a is opened to prevent operation of the printing system.

A more complete description of the operation of the switch 87 may be found below in the discussion of the automatic printing operation.

Automatic printing operation

The normal position of the auxiliary optical system 72 when the printer-viewer is not operating is in the retracted position (see FIGURE 4). With reference now to FIGURE 5, which illustrates a schematic circuit diagram, a description of the operation of the printer-viewer will be made. The printer-viewer 10 is connected to the main power supply 88 through a main power switch 89. Since the first operation would be the viewing operation in order for the operator to select and properly position the particular portion of the microform to be printed, it is necessary to locate the auxiliary optical system 72 in its operative position. To accomplish this, button 90 (FIGURE 1) is depressed manually which closes a spring returned, normally open switch 91 and provides initial energization to the control motor 79. Drivingly connected to the control motor 79 is a cam 92, having notches 93 and 94 spaced 180° apart. A cam follower 95, in contact with the cam 92, is attached to a contact arm 96. Rotation of the motor 79 effects rotation of the notched cam 92 sufficiently to cause the follower 95 to ride out of the notch 93 and close a motor contact 100 to keep the motor energized until the cam has made a 180° rotation. At that time the follower falls back into the second notch 94 de-energizing the motor 79 and closing contact 101. Rotation of the control motor 79 during this period effects repositioning of the auxiliary optical system 72 from the retracted position to the functioning position as is illustrated in FIGURES 4 and 4a. Furthermore, when the mirror link 73 moves from its normal position toward mirror stop 86 the spring loaded switch 87 effects closing of contact 87b and opening contact 87a. This permits illumination of the lamps without operation of the printing system.

A spring-returned, normally open, momentary viewing switch 102 is closed by manually depressing a button 103 in order to turn the lamps 50, 51 or lamp 62 on to illuminate the microform. When contact 101 is open, as when the rider 95 is out of the notch, the lamp circuit is incomplete thus preventing accidental illumination of the microform. When the operator has properly selected and positioned the microform, as described below, such that the image appearing on the viewing screen 18 is precisely the image he desires to print, he releases the viewing button 103, opening the lamp circuit. He then pushes the button 90 which closes the switch 91 and provides initial energization to the control motor 79, as described above, resulting in the cam 92 rotating 180°. During rotation of the cam auxiliary optical system 72 is retracted to its normal, non-functioning position.

After the cam 92 rotates 180°, the follower 95 falls back into a notch 93 and closes contact 101. The mirror link 73 abuts switch 87 closing contact 87a in the print circuit when it reaches the retracted position.

A manually operable, spring-returned print button 105 (FIGURE 1) operates switch 106 provided in the print circuit which, when closed commences operation of the copy paper feed system and lamps through a conventional control circuit 108. After the copy paper is positioned in printing station 42 the lamps 50, 51 or lamp 62 are turned on by the closure of the switch 107 (shown in phantom in the control circuit 108) at the proper time in the print cycle and the microprint is illuminated for a predetermined period of time. A manually controlled input 112 is provided to vary the exposure time and, hence, the intensity of print. Upon elapse of the exposure time, the paper is caused to go through its developing cycle and emerge at the receiving slot 20.

Microform transport mechanism

Figure 6:
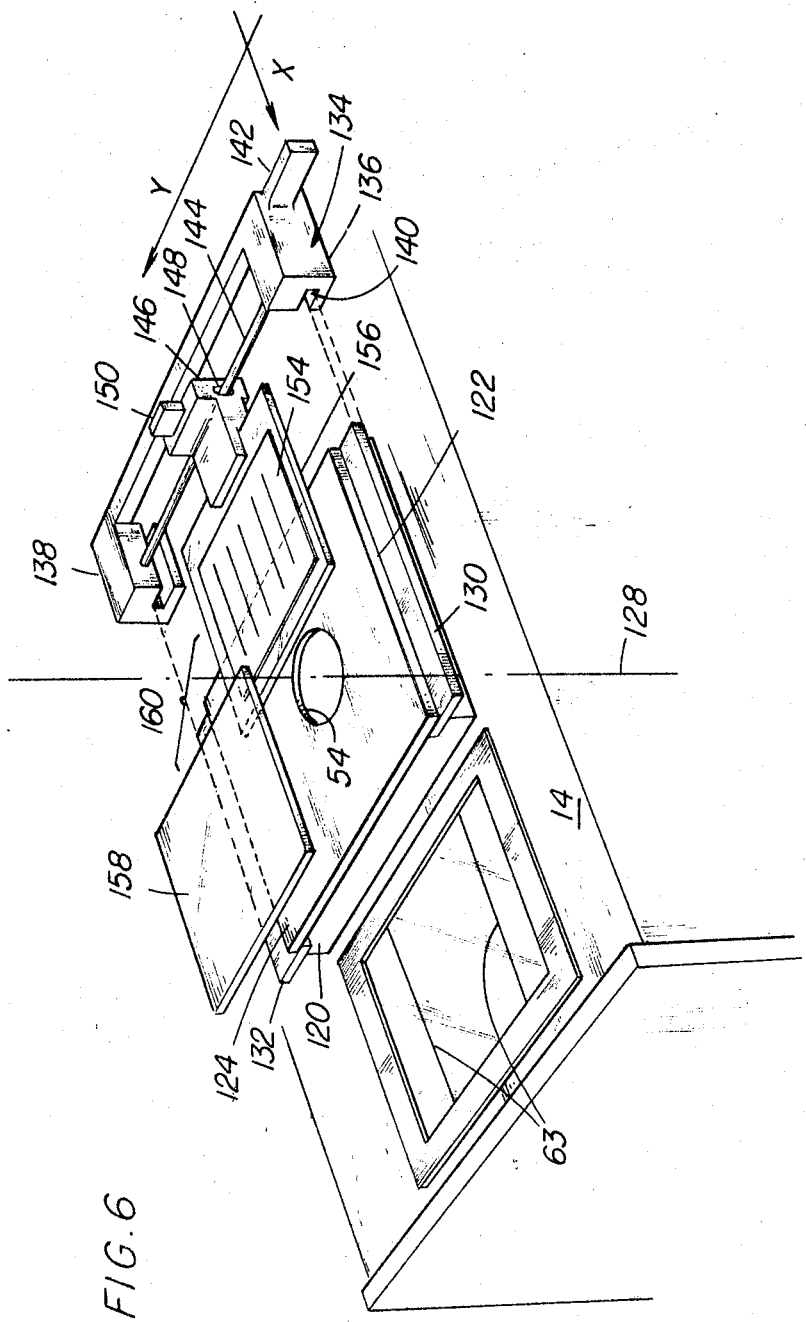
FIGURE 6 is an exploded perspective view of a microform holder and transport mechanism.

In order to permit the operator to move the microform in mutually perpendicular directions within a single plane, a transport mechanism 16 (FIGURE 6) is provided which is adapted to be mounted on the horizontal work surface 14. The work surface 14 in the area adjacent the lens 56 has a platform 120 placed thereon with a support plate or platen 122 having a planar upper surface 124 which is normal to the optical projection axis 128 through the lens 56. The aperture 54 through the support plate 122 is coaxial with the optical projection axis 128.

Attached to the opposite sides of the support plate 122 is a pair of slide means or rails 130, 132 which extend in a direction, referred to as the X-axis, normal to the optical projection axis 128. A carriage 134 having bearing means 136, 138 receive and are guided by the rails 130, 132, respectively. The bearing means are inwardly facing, C-shaped arms forming a channel 140 which extends parallel to the X-axis and which slidably receives the rails 130, 132. A handle 142 is attached to the carriage 134 to provide a means for manually actuating the carriage when desired.

Fixedly attached to the interior surface of the bearing means 136, 138 and extending across the carriage 134 is a guide member or rod 144. Slidably mounted about the rod 144 is a slide member or sleeve 146 having a channel 148 through which the rod 144 passes. The channel 148 is dimensioned such that its width in a direction parallel to the X-axis is a little larger than the diameter of the rod 144 to permit easy sliding of the sleeve 146 along the rod 144 but to prevent relative motion between the sleeve and the rod along the X-axis. The height of the channel 148 is considerably larger than the diameter of the rod 144 to provide freedom of motion of the sleeve in direction parallel to the optical projection axis 128. It is clear that the sleeve 146 is not supported by the rod 144, but merely rides over the rod which serves as a guide. A handle or actuating means 150 is attached to the sleeve 146 to provide means for manually sliding the sleeve in a direction normal to the direction of movement of the carriage 134 or, in other words, along a Y-axis.

The plane defined by the directions of movement of carriage and the sleeve (the X- and Y-axis respectively), is normal to the optical projection axis 128 and, therefore, parallel to the support plate 122. It can be seen that movement of the carriage 134 along the slide rails 130, 132 effects similar movement of the sleeve 146 in the same direction. Therefore, by movement of the carriage-sleeve combination along the X-axis and the sleeve alone along the Y-axis the sleeve can be placed in any position in the X-Y plane with respect to the support plate 122.

A microform or image bearing sheet or film is schematically illustrated at 154. To protect the sheet and insure flatness thereof as well as to simplify the handling and relocation of the sheet with respect to the optical projection axis 128, the sheet 154 is held between two glass pressure plates, a lower plate 156 and an upper plate 158. The plates may be unattached to each other or they may be hinged together. The glass plate 156 is fixedly attached to the sleeve 146 by mechanical fasteners of the removable type such as bolts or of the fixed types such as rivets, or through the use of suitable, conventional adhesives. The lower glass plate then rests directly upon and is supported solely by the support plate 122. Therefore, as long as the upper surface of the support plate 122 and the lower surface of the lower plate 156 are planar, sliding movement of the sandwich 160, formed of the two glass plates 156, 158 and the image bearing sheet 154, on the plate 122 will take place in a single plane, which is caused to be the focal plane of the optical projection system. Any inaccuracies in the manufacture of the carriage 134, the slides 130, 132, the guide rod 144, or the sleeve 146, will have no effect on the planar movement of the sandwich 160. To facilitate sliding relative movement between the sandwich 160 and the support plate 122 by reducing the friction, the support plate is coated on its upper surface 124 with a thin film polytetrafluoroethylene (Teflon).

It can be seen that when viewing is desired, the operator, while seeing the microform on the viewing screen 18, can locate and align any portion of the microform sheet 154 by merely manipulating the transport mechanism 116.

Manual printing operation

Figure 8:
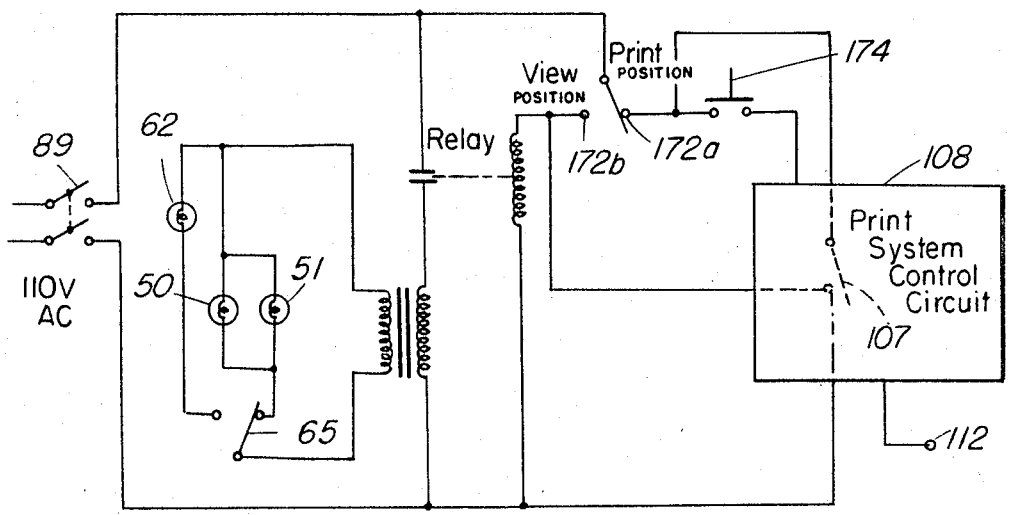
FIGURE 8 is a circuit diagram for a manually operated printer-viewer.

While the above description of a means for relocating the auxiliary optical system 72 has been in terms of a motorized operation it is clear that the auxiliary optical system can be positioned manually. Referring now to FIGURES 7 and 8 there is illustrated such a manual system. The auxiliary lens 66 and mirror 70 are ganged together by struts 164 on the ends thereof and are jointly attached to a rotatably mounted shaft 166. The shaft 166 extends through the front wall 22 of the housing 12 and has on the outside end thereof a bell crank 170. Rotation of the bell crank by the operator effects rotation of the auxiliary optical system 72 from the retracted position to the functioning position. A single pole, double throw switch 172 (FIGURE 8) is provided so that when the auxiliary optical system is in its retracted position, contact 172a is closed and when the mirror is moved toward its operational position, a spring loaded contact arm opens contact 172a and closes contact 172b and energizes the lamps 50, 51. The shaft is spring-loaded so that it normally rests in the non-functioning or retracted position of the auxiliary optical system 72. Upon release of the bell crank 170 the shaft 166 automatically returns the auxiliary optical system to its normal inoperative position and opens the contact 172b, turning the lamps off and closes the contact 172a. Closing of the contact 172a permits the print system control circuit 108 to receive power through print switch 174. In order to provide a print the operator depresses the print button 105 which closes print switch 174 and signals the control circuit 108. The control circuit controls operation of the copy paper feed system and lamps as was described above.

Other modifications

The above description has been in terms of using a photoelectrically sensitive copy paper which then goes through a series of development stages. This invention is not limited to the use of such paper and, in fact, can be used with other sensitized media such as conventional silver salt photographic paper, diazo, or any other photosensitive material. The sequence of operations will remain the same i.e., the sensitized medium will be positioned in the print station, the microform will be illuminated for a predetermined time interval, illumination will then be terminated and the exposed sensitized medium will be moved onward through an appropriate development cycle.

As will be apparent to those skilled in the art, various modifications can be carried out from the above disclosure without departing from the spirit and scope of the invention embodied within the below claims.

What is claimed as new and desired to be secured by Letters Patent of the United States is:

1. A printer-viewer for enlarging and printing microforms comprising,
 (a) a housing
 (b) microform support and transport means mounted on said housing,
 (c) microform illumination means,
 (d) a printing station,
 (e) means for positioning a photosensitive medium at said printing station,
 (f) a viewing station having a screen adjacent to said support means,
 (g) a stationary primary optical system for projecting an image from the microform to said printing station and onto said medium for recording thereon at a predetermined size, said size being readable with the naked eye, (h) a movable auxiliary optical projection system including a supplemental lens and mirror which, in combination with said primary optical system, projects and focuses said image onto said screen at a size substantially smaller than said predetermined size and capable of being read with the naked eye, and (i) means for moving said auxiliary optical system from a first position wherein said auxiliary optical system is out of optical alignment with said primary optical system permitting light from said illumination means to be transmitted to said printing station to a second position wherein said auxiliary optical system is in optical alignment with said primary optical system effecting transmission of light from said illumination means to said viewing station.

2. A printer-viewer as defined in claim 1 wherein said stationary projection system includes one mirror for reflecting said image to said printing station.

3. A printer-viewer as defined in claim 1 wherein the auxiliary optical system moving means is operated manually.

4. A printer-viewer as defined in claim 1 wherein the auxiliary optical system moving means is motorized.

5. A printer-viewer as defined in claim 1 including control means for preventing operation of said means for positioning a photosensitive medium when said auxiliary optical system is in a position other than said first position.

6. A printer-viewer as defined in claim 5 wherein said control means includes actuating means for energizing said illumination means when said auxiliary optical system is in said second position and for sequentially energizing said means for positioning a photosensitive medium and then said illumination means when said auxiliary optical systems is in said first position.

7. A printer-viewer as defined in claim 1 wherein said illumination means includes selection means for selectively illuminating transparent microforms and opaque microforms.

8. A printer-viewer as defined in claim 7 wherein said illumination means includes a movable lamp located on the side of said support means remote from said primary optical system and wherein said selection means is operated by movement of said movable lamp into and out of its operating position.

9. A printer viewer as defined in claim 1 wherein the primary optical system includes a fixed focus lens and wherein the auxiliary optical system includes a fixed focus lens.

10. A printer-viewer as defined in claim 8 wherein said primary optical system includes one mirror for reflecting the image from said microform to said printing station.

11. A printer-viewer as defined in claim 8 wherein said transport means includes (a) a support plate normal to an axis through the lens of the primary optical system and having an aperture therethrough coaxial with said axis, (b) a planar, glass plate, for receiving said microform, resting upon said support plate, and (c) a carriage movably mounted on said support plate and drivingly connected to said glass plate, said carriage providing orthogonal motion to said glass plate in the plane normal to said axis.

12. A printer-viewer for enlarging and printing microforms comprising, (a) a housing including an upper surface, said upper surface having an aperture therethrough, (b) microform support and transport means mounted on said upper surface above said aperture said transport means being manually operable for providing orthogonal motion to said microforms directly above said aperture effecting scanning of said microform, (c) first illumination means for illuminating opaque microforms fixedly mounted within said housing below said aperture, (d) second illumination means for illuminating transparent microforms movably mounted above said aperture, said second illumination means being manually movable from an inoperative position out of alignment with said aperture to an operative position wherein light is transmitted through said aperture, (e) selection means for selectively energizing said first or said second illumination means, (f) a printing station (g) means for positioning a photosensitive medium at said printing station (h) a viewing station including a rear illumination screen mounted in said upper surface adjacent to said support and transport means, (i) a primary optical system for projecting and focusing an image from the microform to said printing station and onto said medium for recording thereon at a predetermined size, said size being readable with the naked eye, said primary optical system including a fixed focus lens fixedly mounted directly beneath said aperture and a fixedly mounted mirror mounted below said lens and spaced therefrom, (j) an auxiliary optical system for projecting an image from said microform onto said screen at a size substantially smaller than said predetermined size and capable of being read with the naked eye, said auxiliary optical system including a supplemental, fixed focus lens and a mirror movably mounted within said housing and a stationary mirror fixedly mounted below said screen, said supplemental lens and the primary lens together providing the proper focus of said image on said screen, (k) means for moving the lens and mirror of said auxiliary optical system from a first position wherein said auxiliary optical system is out of optical alignment with said primary optical system permitting light from either of said illumination means to be transmitted to said printing station to a second position wherein said supplemental lens and mirror are in optical alignment with the stationary lens of said primary optical system effecting transmission of light from either of said illumination means to the stationary mirror of said auxiliary optical system and then to said screen, and (l) control means for
  (i) preventing operation of means for positioning said photosensitive medium when said auxiliary optical system is in a position other than said first position,
  (ii) energizing said illumination means when said auxiliary optical system is in said second position and
  (iii) sequentially energizing said means for positioning said photosensitive medium and then said illumination means when said auxiliary optical system is in said first position.

References Cited
UNITED STATES PATENTS

| | | | |
|---|---|---|---|
| 3,167,997 | 2/1965 | Robin | 355—60 |
| 3,181,416 | 5/1965 | Halberg | 355—27 |
| 3,366,003 | 1/1968 | Williamson | 355—66 X |
| 3,408,141 | 10/1968 | Grant | 355—28 |

NORTON ANSHER, Primary Examiner

RICHARD A. WINTERCORN, Assistant Examiner

U.S. Cl. X.R.

355—28, 66